United States Patent [19]

Hagstrom et al.

[11] Patent Number: 5,578,693
[45] Date of Patent: Nov. 26, 1996

[54] MULTIFUNCTIONAL TERMINALLY UNSATURATED URETHANE OLIGOMERS

[75] Inventors: Richard A. Hagstrom, Cheshire; Jay K. Martin, Winsted, both of Conn.

[73] Assignee: Bomar Specialties Company, Winsted, Conn.

[21] Appl. No.: 523,245

[22] Filed: Sep. 5, 1995

[51] Int. Cl.⁶ .................................................. C08G 18/10
[52] U.S. Cl. ........................... 528/75; 528/66; 528/65; 528/85; 522/90; 522/98
[58] Field of Search ................................. 528/66, 75, 65, 528/85; 522/90, 98

[56] References Cited

U.S. PATENT DOCUMENTS

| | | |
|---|---|---|
| 3,891,523 | 6/1975 | Hisamatsu et al. . |
| 3,991,024 | 11/1976 | Nakamoto . |
| 4,131,602 | 12/1978 | Hodakowski et al. . |
| 4,138,299 | 2/1979 | Bolgiano . |
| 4,246,391 | 1/1981 | Watson, Jr. . |
| 5,237,018 | 8/1993 | Sorathia et al. .......................... 528/75 |
| 5,451,652 | 9/1995 | Guo et al. ................................ 528/66 |

OTHER PUBLICATIONS

Brian Martin "Acrylated Polyurethane Oligomers", *Radiation Curing*, Aug. 1986, pp. 4–16.

JoAnn A. McConnell and F. Kurt Willard, "Structure–Performance Relationships of Urethane Acrylates", ACS Symposium, Radiation Curing of Polymeric Materials, Chapter 20 (1989).

*Primary Examiner*—Melvyn I. Marquis
*Attorney, Agent, or Firm*—William A. Simons

[57] ABSTRACT

A multifunctional terminally unsaturated urethane oligomer comprising the reaction product of (a) a terminally unsaturated isocyanate containing polyurethane oligomer with (b) an alkoxylated polyhydric alcohol.

6 Claims, No Drawings

MULTIFUNCTIONAL TERMINALLY UNSATURATED URETHANE OLIGOMERS

BACKGROUND OF THE INVENTION

1. Field of the Invention

This invention relates to selected multifunctional terminally unsaturated urethane oligomers useful for curing by radiation such as UV light or electron beam. The present invention also relates to the process for making these oligomers as well as radiation curable polymer formulations containing these oligomers.

2. Description of the Prior Art

Environmental advantages, production efficiencies, and low-cost plant installations continue to spur growth for radiation curable materials. With this growth, this is an awareness that better radiation curable materials are needed for specific applications.

Terminally unsaturated urethane oligomers, more commonly called capped urethane oligomers, have been used in such radiation curing applications. These capped urethanes are readily available and have found widespread commercial use. Like conventional urethanes, they possess toughness, wear resistance, adhesion, and flexibility besides being curable by UV light.

Several prior art methods for making capped urethanes have been disclosed:

(1) reaction of a polyol with a polyisocyanate followed by capping that intermediate product with a hydroxyl-functional acrylate or hydroxyl-functional vinyl ether; or (2) reaction of a hydroxyl-functional acrylate or hydroxy-functional vinyl ether with a polyisocyanate followed by reaction of that intermediate product with a polyol; or (3) simultaneous reaction of a polyol, a polyisocyanate, and a hydroxyl-functional acrylate or hydroxyl-functional vinyl ether.

These capped urethane oligomer products are then rapidly polymerized by the free radicals or cations generated by exposure to radiation such as ultraviolet light or electron beams.

The overall chemical formula of these terminally unsaturated urethane oligomers is the single most important factor for their performance in radiation-curing applications because it is primarily responsible for the basic polymer properties required in the overall product. While reactive monomers can be blended with these oligomers for viscosity reduction, both the type and amount of monomer have less affect on the desired properties of the final cured product than these oligomers. More specifically, the oligomer viscosity and its ease of reduction with minimal quantities of reactive monomers is of critical importance in achieving certain processing applicability. An excellent discussion of how viscosity and other characteristics are effected by the design of the oligomer is presented by B. Martin, *Radiation Curing*, 13(3), 4 (1986).

Since viscosity of the oligomers is, in general, a function of increasing molecular weight, rigid films formed from the radiation curing of low molecular weight capped urethane oligomers with low solution viscosity can approach the properties of conventional rigid urethanes. However, flexible films obtained in radiation curing have not performed as well as conventional moisture cured or two-component urethane counterparts.

There is, therefore, a constant challenge in the radcure industry to achieve oligomer performance more similar to that obtainable by conventional flexible urethanes while maintaining a low enough viscosity to permit practical use. Hodakowski et al., U.S. Pat. No. 4,131,602, describes an approach to lowering viscosity by blending various polyols in making the acrylated urethane oligomers. A second patent by Watson, Jr., U.S. Pat. No. 4,246,391, describes a process modification wherein the diisocyanate is first reacted with a hydroxyl acrylate before adding a polyol. However, the reaction products in each patent were both highly diluted with a reactive monomer.

Another approach to improve oligomer performance is to increase the functionality of the oligomer beyond two functional by reacting a multi-functional modifying group (e.g., a polyhydric alcohol) with the acrylated urethane oligomer. In general, this approach improves the tensile strength of the final polymer and gives improved solvent resistance. Again, while properties can be improved, the increased functionality also increases viscosity which limits the useable concentration of oligomer in a final formulation. A discussion on the effects of oligomer functionality is presented in J. McConnell et al., ACS Symposium, Radiation Curing of Polymeric Materials (1989).

The present invention is different from the above-noted traditional technologies because it provides an approach whereby oligomer functionality and urethane character are both increased while viscosity is decreased.

BRIEF SUMMARY OF THE INVENTION

The present invention achieves these dramatic viscosity decreases in higher functionality oligomers by incorporating alkoxylated polyhydric alcohols as the functionality modifier into the reaction stoichiometry of the capped urethane oligomer.

Accordingly, one aspect of the present invention is a multifunctional terminally unsaturated urethane oligomer comprising the reaction product of (a) a terminally unsaturated isocyanate-containing urethane oligomer with (b) an alkoxylated polyhydric alcohol.

A second aspect of the present invention is directed to a process for producing these multi-functional terminally unsaturated urethane oligomers comprising the steps of:

(1) reacting at least one diisocyanate with at least one polyol to form an isocyanate-terminated prepolymer;

(2) reacting a portion of the unreacted terminal isocyanate groups with at least one hydroxyl-functional acrylate or hydroxyl-functional vinyl ether to form a terminally unsaturated isocyanate-containing urethane oligomer; and (3) reacting the remaining terminal isocyanate groups with at least one alkoxylated polyhydric alcohol.

A third aspect of the present invention is a radiation-curable formulation comprising:

(1) a multifunctional terminally unsaturated urethane oligomer comprising the reaction product of (a) a terminally unsaturated isocyanate-containing polyurethane with (b) and alkoxylated polyhydric alcohol; and (2) a reactive monomer.

DETAILED DESCRIPTION OF THE INVENTION

The term "terminally unsaturated isocyanate-containing urethane oligomer" as employed in the present specification refers to any polyurethane compound that contains an unsaturated terminal groups and also contains isocyanate groups. The unsaturated terminal groups are preferably formed from hydroxyl-functional acrylates and hydroxyl-functional vinyl ethers. Commercially available species of these preferred classes of capped urethane oligomers are available and are better known as acrylated polyurethanes and vinyl ether polyurethanes, respectively. These terminally unsaturated isocyanate-containing polyurethanes are made by reacting a polyisocyanate with a polyol and a hydroxyl-functional compound having an unsaturated group (e.g. hydroxylacrylate or hydroxyvinyl ether). The reaction of these three species may be sequential or simultaneous as is conventionally employed. The present invention is not intended to be limited to any particular method for making these "terminally unsaturated isocyanate-containing urethane oligomers."

Preferably, the polyisocyanate is a diisocyanate. Suitable diisocyanates are methylene bis(phenyl isocyanate) (also known as MDI) 2,4-toluene diisocyanate (2,4-TDI); a 80:20 mixture of 2,4- and 2,6-toluene diisocyanate (also known as TDI); 3,-isocyanatomethyl-3,5,5-trimethyl cyclohexylisocyanate (IPDI); m-tetramethyl xylene diisocyanate (TMXDI); hexamethylene diisocyanate (HDI); and methylene bis(cyclohexyl isocyanate) (sold as Desmodur W).

The polyol used in the present invention may be any polyether polyol or polyester polyol. Examples of polyether polyols include poly(propylene oxide) diols, copoly(ethylene oxide-propylene oxide) diols, and poly(tetramethylene oxide) diols.

Examples of polyester polyols preferably include any well known di-, tri-, or tetrahydroxy-terminated polyesters such as polylactone polyesters and polyester polyols produced by the polycondensation reactions of dicarboxylic acids or their anhydrides with di-, tri-, or tetra-alcohols.

The term "hydroxyl-functional acrylate" means any hydroxyl-substituted acrylate or methacrylate compound that would be suitable for making and using a capped urethane oligomer. Preferred examples of such compounds include 2-hydroxyethyl acrylate, 2-hydroxypropyl acrylate, 2-hydroxyethyl methacrylate, pentaerythritol triacrylate (PETA), and 4-hydroxybutyl acrylate.

The term "hydroxyl-functional vinyl ether" means any hydroxyl-substituted vinyl ether that would be suitable for making and using a capped urethane oligomer. Preferred examples include ethylene glycol monovinyl ether, and cyclohexane dimethanol monovinyl ether.

The preferred multifunctionality modifiers are a nominal 6 mole ethoxylate of trimethylolpropane [TMP (EO)$_6$] available as MACOL RD 306EM from PPG Industries, and a nominal 12 mole propoxylate of sorbitol [SORB(PO)$_{12}$] available as THANOL LS 490 from Eastman Chemical Co. Again, these are used for illustrative purposes, and any alkoxylated polyhydric alcohol with a functionality greater than 2 would be considered within the scope of this invention.

Molecular weight will depend upon particular polyols, polyisocyanates and their ratio and the particular multifunctional modifier. Generally, the number average molecular weight (MW$_n$) of the multifunctional terminally unsaturated urethane oligomers of the present invention may be from about 1,500 to about 10,000 not considering chain extension.

One preferred aspect of the invention relates to a capped urethane oligomer comprising the combination of:

(a) at least one diisocyanate with an equivalent weight between 80 and 200;

(b) at least one polyol with an equivalent weight between 100 and 2,000;

(c) at least one hydroxyacrylate or hydroxy vinyl ether; and (d) at least one alkoxylated polyhydric alcohol with an equivalent weight between 32 and 200.

This preferred aspect of the invention is based upon improved oligomer performance by raising the functionality of the capped urethane oligomers to greater than 2 functional but less than 6 functional with accompanying decreases in viscosity compared to the described traditional approaches. The approach has further advantages in that any mixture of isocyanate, hydroxyacrylate or hydroxyvinyl ether, and polyol can be used to achieve final properties of the curable material.

In particular, the polyurethane oligomer viscosity is minimized by using alkoxylated polyhydric alcohols in adjusting reaction stoichiometry. The effect is shown in the following formula formed from a 6 mole ethoxylate of TMP and a hydroxyl-functional acrylate:

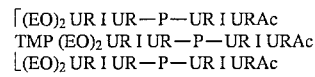

where Ac is an hydroxyacrylate that reacts with the terminal isocyanate of the isocyanate-containing prepolymer to form a urethane linkage (Ur); I is the diisocyanate moiety that also forms an urethane when reacted the polyol (P); and EO is an ethylene oxide group.

The effect is also shown in the following formula formed from a 12 mole propoxylate of sorbitol and a hydroxyl-functional vinyl ether:

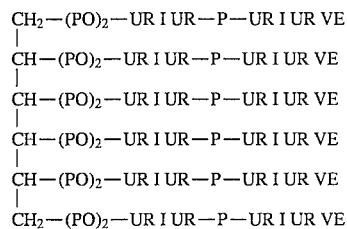

wherein VE is the hydroxyl-substituted vinyl ether that reacts with the terminal isocyanate of the prepolymer to form an urethane linking group UR, I is a diisocyanate moiety; P is a polyol moiety and PO is a propylene oxide moiety.

The examples below indicate that by separating the functional modifier (i.e., polyhydric alcohol such as TMP or Sorbitol) from the closest urethane groups by alkoxy units (e.g., EO or PO groups) and increasing the functionality of the modifying alkoxylated poly-hydric alcohol to greater than 2, a dramatic decrease in oligomer viscosity can be realized compared to similar TMP or sorbitol products without the EO or PO groups, without adversely affecting the other properties. Also, by increasing the functionality of the modifier, the urethane content of the polyhydric molecule is also increased (e.g. substituting sorbitol for TMP, for example, increases the number of urethane groups in the above-described oligomers to 24).

The multifunctional, terminally unsaturated urethane oligomers of the present invention are radiation curable according to conventional method of radiation curing including the use of ultraviolet light and electron beam energy. Generally, these multifunctional terminally unsaturated urethane oligomers may be used alone or as the principal component of the radiation curable composition, along with other components such as reactive monomers, crosslinkers and photoinitiators.

Preferably, the concentration of these multifunctional terminally unsaturated urethane oligomers is from about 20 to 100 weight percent, more preferably 50 to 100 weight percent of the radiation curable composition.

Reactive monomers (also known as reactive solvents) are generally also present in these radiation curable composition. Generally, any reactive monomer which is suitable for conventional radiation curable composition may be used with the multifunctional terminally unsaturated urethane oligomers. The preferred class of reactive solvents are acrylates or methacrylates. The preferred concentration of reactive monomers in the radiation curable composition may be from zero to 40 weight percent, more preferably zero to 20 weight. The radiation curable composition may also contain conventional crosslinking agents and photoinitiators. The concentration of each of these classes of ingredients may preferably be from 0 to 30 weight percent, based on the total weight of the radiation curable composition.

The radiation curable compositions may also contain small amounts of conventional additives much as pigments, wetting agents, and the like, which are employed in the usual known effective concentrations.

The radiation curable compositions of the present invention are produced by conventional methods by mixing the selected components together. The compositions can be applied substrate by conventional means, including spray, curtain, dip pad, roll-coating and brushing procedures. The compositions can be applied to any acceptable substrate such as wood, metal, glass, fabric, paper, fiber, plastic, and the like.

The applied radiation curable composition can be cured by any of the known actinic radiation curing methods such as exposure to ultraviolet light, X-rays, alpha particles, electron beam, or gamma rays. Irradiation can be performed using any of the known and commonly available types of radiation curing equipment, for example, curing may be done by low, medium, or high pressure mercury arc lamps. Curing can be carried out in air or in an inert atmosphere such as nitrogen or argon. Exposure time required to cure the composition varies somewhat depending on the specific formulation, type and wavelength of radiation, energy flux, and film thickness. Those skilled in the art of radiation technology will be able to determine the proper curing time for any particular composition. Generally, the cure time is rather short, that is, less than about 60 seconds.

The following examples further illustrate the present invention. All parts and percentages are by weight and all temperatures are degrees Celsius unless explicitly stated otherwise. In all cases, the optimum reaction stoichiometry was computer generated using the initial weight of the polyol and setting the desired functionality of the final polymer. The program required entering:

1. The functionality of the polyhydric alcohol.
2. The equivalent weight of the polyhydric alcohol.
3. The isocyanate equivalent weight.
4. The polydiol hydroxyl number.

Urethane prepolymers were prepared, conventionally, by a catalyzed reaction between the polydiol with the isocyanate. Upon completion of the prepolymer reaction, the hydroxyl functional - acrylate was added in the required stoichiometry and, finally, the functionality modifier was introduced. The reaction was continued to completion as indicated by infrared analysis for absence of isocyanate groups. The effects of different alkoxylates, chain length of the alkoxylate having using functionality modifiers from 3 and 6 functions are shown.

COMPARISON 1 AND EXAMPLES 1–2

To demonstrate the effect, a series of oligomers have been prepared at a 2.4 functionality using a variety of 1,000 $MW_n$ polydiols and isocyanates all capped with hydroxyethyl acrylate. The effect is not limited to this functionality, this molecular weight, or the selected hydroxyacrylate.

These three 2.4 functional acrylate-capped polyurethane oligomers were prepared and tested in the following manner:

A polytetramethylene oxide diol ($MW_n$=1,000 and having a nominal hydroxyl number of 112 mg. KOH per gram) was added to a stirred one liter glass flask fitted with a thermocouple. Then a stoichiometric amount of bis(4-isocyanato cyclohexyl) methane ($H_{12}$MDI) was added to the flask. The flask contents were heated to 50° C. and dibutyl tin dilaurate catalyst (0.05% by weight of the polyol) was immediately introduced into the flask. The reaction mixture was then maintained at the 50° C. for two more hours, followed by raising the reaction temperature to 80° C. for an additional two hours.

After that time, the reaction temperature was lowered to 65° C. and hydroxyethyl acrylate (HEA) [containing 0.2% by weight 2,6-di-tert-butyl-4-methylphenol (BHT)] was added to the flask. The flask was maintained at 65° C. for two hours after HEA addition, and then a functionality modifier (either trimethylolpropane (TMP) as for Comparison 1, a 6mole ethoxylated TMP [TMP(EO)$_6$] as for Example 1, or a 12-mole propoxylate of sorbitol [SORB(PO)$_{12}$] as for Example 2) was added to the flask. After this addition, the reaction mixture was continually heated at 65° C. for six more hours to completion. The hydroxyl equivalent weights used were TMP=44.7; TMP(EO)$_6$=132.4; and SORB(PO)$_{12}$=114.8. Both the TMP and TMP(EO)$_{12}$ functionality modifiers had a nominal functionality of 3.0. The SORB(PO)$_{12}$ functionality modifier had a nominal functionality of 4.76 (corrected for impurities). The relative amounts of diol and functionality modifier in each experiment were chosen so that the final oligomer would have a 2.4 functionality. The charges of each of these reactants, for all three experiments, are as follows:

| Reactant | C-1 | E-1 | E-2 |
| --- | --- | --- | --- |
| Diol | 250 grams | 250 grams | 250 grams |
| $H_{12}$MDI | 130.7 | 130.7 | 130.7 |
| HEA | 38.6 | 38.6 | 45.0 |
| TMP | 3.7 | — | — |
| TMP(EO)$_6$ | — | 22.0 | — |
| SORB(PO)$_{12}$ | — | — | 12.8 |

A photocurable polymer formulation was prepared by combining each oligomer with isobornyl acrylate (IBOA) in a 70% by weight oligomer/30% by weight IBOA mixture. IRGACURE 184 (1% of the total mixture) was added as a photoinitiator.

Castings were made from each of these formulated oligomer/IBOA mixture in either EPDM or polypropylene cavities that were held between sheets of polyester which were clamped between glass plates. Curing was effected by exposing each side of the sample cavity for 60 seconds at approximately 30 milliwatts/cm$^2$ of UV-A and UV-B radiation from a metal halide lamp (Osram Ultramed). Each cast sample was conditioned in an ambient atmosphere for seven days prior to physical property testing. Each cured specimen conformed to ASTM-638. The test results are shown in the following Table 1. Each given test result is the average of five tests.

TABLE 1

| | | 70/30 in IBOA | | | | |
| --- | --- | --- | --- | --- | --- | --- |
| | | Visc. cps @ | Tensile | Elonga-tion | Hardness Shore | |
| Example | Modifier | 25° C. | psi | % | A | D |
| C-1 | TMP | 100,000 | 752 | 91 | 90 | 40 |
| E-1 | TMP(EO)$_6$ | 81,000 | 755 | 83 | 94 | 45 |
| E-2 | SORB(PO)$_{12}$ | 57,000 | 1405 | 82 | 96 | 55 |

As seen in Table 1, the straight TMP modified oligomer gave the highest viscosity of the series. This is most likely attributable to the short chain lengths separating the urethane groups in the modifying alcohol. However, this product has shown excellent properties in commercial use, particularly in solvent and abrasion resistance. The limiting factor for its further utility is its high viscosity.

In the TMP(EO)$_6$ case, while the functionality modifier also has a 3f nominal functional, each hard urethane segment is separated by four ethylene oxide or soft segment units. The 19% decrease in viscosity is evident without loss of polymer properties. Such a viscosity reduction in the formulated product would permit significant additional utility in radiation-curing applications.

The SORB(PO)$_{12}$ experiment shows the inter-relationship of two variables. As in the TMP(EO)$_6$ case, the hard segment urethane groups are each separated by two alkylene oxide units, in this case propylene oxide. However, the effect of the second contributing factor of increased modifier functionality is evident. By increasing the functionality of the modifier, fewer moles of the modifier are required to achieve the same effect. While identical stoichiometry is achieved, in reality, there is a higher mole concentration of the lower viscosity 2f acrylate. Physical test data on the cured polymer in Example 2 showed there has been no loss in polymer properties.

COMPARISON 2 AND EXAMPLES 3 AND 4

To further test the effect, 2.4 functional oligomers were prepared as in Example 1, except that m-tetramethyl xylene diioscyanate (TMXDI) was substituted for H$_{12}$MDI as the diisocyanate. The charges of each reactant was as follows:

| Reactant | C-2 | E-3 | E-4 |
| --- | --- | --- | --- |
| Diol | 250 grams | 250 grams | 250 grams |
| TMXDI | 121.9 | 121.9 | 121.9 |
| HEA | 38.6 | 38.6 | 45.0 |
| TMP | 7.4 | — | — |
| TMP(EO)$_6$ | — | 22.0 | — |
| SORB(PO)$_{12}$ | — | — | 12.8 |

The physical property listing results are shown in Table 2.

TABLE 2

| | | 70/30 in IBOA | | | | |
| --- | --- | --- | --- | --- | --- | --- |
| | | Visc. cps @ | Tensile | Elonga-tion | Hardness Shore | |
| Example | Modifier | 25° C. | psi | % | A | D |
| C-2 | TMP | 21,600 | 267 | 91 | 77 | 31 |
| E-3 | TMP(EO)$_6$ | 14,400 | 302 | 83 | 71 | 28 |
| E-4 | SORB(PO)$_{12}$ | 12,600 | 352 | 72 | 79 | 37 |

As is evidenced by the data in Table 2, significantly lower viscosities can be obtained by incorporating TMXDI as the reacting isocyanate, at the same time producing much softer polymers. However, the effect of using alkoxylated modifiers is still evident in the lowering of the viscosity of the respective oligomers.

COMPARISON 3 AND EXAMPLES 5 AND 6

In this example, oligomers were prepared as in Example 1, except that the 2.4 functional oligomers were prepared using a 1,000 M$_w$ mixed ethylene oxide/propylene oxide (EO/PO) polyetherdiol as a substitute for the polytetramethylene oxide diol.

The charges of each reactant was as follows:

| Reactant | C-3 | E-5 | E-6 |
| --- | --- | --- | --- |
| Diol | 250 grams | 250 grams | 250 grams |
| H$_{12}$MDI | 130.7 | 130.7 | 130.7 |
| HEA | 38.6 | 38.6 | 45.0 |
| TMP | 3.7 | — | — |
| TMP(EO)$_6$ | — | 22.0 | — |
| SORB(PO)$_{12}$ | — | — | 12.8 |

The physical property testing results are shown in Table 3.

TABLE 3

| | | 70/30 in IBOA | | | | |
| --- | --- | --- | --- | --- | --- | --- |
| | | Visc. cps @ | Tensile | Elonga-tion | Hardness Shore | |
| Example | Modifier | 25° C. | psi | % | A | D |
| C-3 | TMP | 25,600 | 1,155 | 84 | 96 | 54 |
| E-5 | TMP(EO)$_6$ | 22,400 | 943 | 85 | 93 | 52 |
| E-6 | SORB(PO)$_{12}$ | 19,400 | 879 | 63 | 96 | 52 |

The use of EO/PO polyols to reduce viscosity is well known and is indicated in Table 3. In this case, the cured polymer properties are, again, comparable. However, the effect of the type of functionality modifier is again evident on the viscosity.

COMPARISON 4 AND EXAMPLES 7 AND 8

In this example, the combined effects of the constituents of the invention are shown. In this example, a 2.4 functional oligomer is prepared using TMXDI as the isocyanate, with a 1,000 M$_w$ EO/PO polydiol.

The charge of each reactant was as follows:

| Reactant | C-4 | E-7 | E-8 |
| --- | --- | --- | --- |
| Diol | 250 grams | 250 grams | 250 grams |
| TMXDI | 121.9 | 121.9 | 121.9 |

-continued

| Reactant | C-4 | E-7 | E-8 |
|---|---|---|---|
| HEA | 38.6 | 38.6 | 45.0 |
| TMP | 7.4 | — | — |
| TMP(EO)$_6$ | — | 22.0 | — |
| SORB(PO)$_{12}$ | — | — | 12.8 |

The physical property testing results are shown in Table 4.

TABLE 4

| | | 70/30 in IBOA | | | |
|---|---|---|---|---|---|
| | | Visc. cps @ | Tensile | Elonga- tion | Hardness Shore |
| Example | Modifier | 25° C. | psi | % | A | D |
| C-4 | TMP | 7,350 | 267 | 76 | 79 | 35 |
| E-7 | TMP(EO)$_6$ | 6,100 | 266 | 69 | 74 | 31 |
| E-8 | SORB(PO)$_{12}$ | 5,600 | 353 | 68 | 78 | 37 |

The combined effect of TMXDI as the isocyanate and the EO/PO polyetherdiol is evident in their viscosity lowering and in producing a softer polymer. However, the use and type of the functionality modifier is still evident with its effect on the lowering of oligomer viscosity.

COMPARISON 5 AND EXAMPLES 9 AND 10

Finally, to further test the invention, 2.7 functionality oligomers were prepared using H$_{12}$MDI as the isocyanate and 1,000 M$_w$ polytetramethylene oxide diols.

The charge of each reactant was as follows:

| Reactant | C-5 | E-9 | E-10 |
|---|---|---|---|
| Diol | 250 grams | 250 grams | 250 grams |
| H$_{12}$MDI | 130.7 | 130.7 | 130.7 |
| HEA | 32.6 | 32.6 | 40.0 |
| TMP | 9.8 | — | — |
| TMP(EO)$_6$ | — | 28.9 | — |
| SORB(PO)$_{12}$ | — | — | 17.7 |

The physical property testing results are shown in Table 5.

TABLE 5

| | | 70/30 in IBOA | | | |
|---|---|---|---|---|---|
| | | Visc. cps @ | Tensile | Elonga- tion | Hardness Shore |
| Example | Modifier | 25° C. | psi | % | A | D |
| C-5 | TMP | 496,000 | 1,206 | 102 | 91 | 40 |
| E-9 | TMP(EO)$_6$ | 128,000 | 980 | 103 | 90 | 43 |
| E-10 | SORB(PO)$_{12}$ | 87,200 | 1,137 | 81 | 96 | 49 |

Increasing functionality is followed by increasing viscosity of the respective oligomers. In the case of the TMP modified material, the high viscosity makes it almost unusable. However, the alkoxylated modifiers bring the oligomers within a usable range for some applications.

It is quite evident that the alkoxylated modifiers extend the useful applicability of the higher functionality oligomers, and that properties can be more tailored to the particular end use.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A multifunctional terminally unsaturated urethane oligomer comprising the reaction product of (a) a terminally unsaturated isocyanate containing polyurethane oligomer with (b) an alkoxylated polyhydric alcohol.

2. A process for producing the multifunctional terminally unsaturated urethane oligomer comprising:

(1) reacting at least one diisocyanate with at lest one polyol to form an isocyanate terminated prepolymer;

(2) reacting a portion of the unreacted terminal isocyanate groups with at least one hydroxyl-functional acrylate or hydroxyl-functional vinyl ether to form a terminally unsaturated isocyanate-containing urethane oligomer; and (3) reacting the remaining terminal isocyanate groups with at least one alkoxylated polyhydric alcohol.

3. The multifunctional terminally unsaturated urethane oligomer of claim 1 wherein said terminally unsaturated isocyanate-containing urethane oligomer (a) is prepared by reacting (i) at least one diisocyanate having an equivalent weight of from about 80 to about 200; (ii) at least one polyol having an equivalent weight from about 100 to 2,000; and (iii) at least one hydroxyacrylate or at least one hydroxyl vinyl ether.

4. The multifunctional terminally unsaturated urethane oligomer of claim 1 wherein the number of moles of alkoxylate in said alkoxylated polyhydric alcohol is from about 3 to about 12.

5. The multifunctional terminally unsaturated urethane oligomer of claim 1 wherein said alkoxylated polyhydric alcohol (b) comprises:

(a) a functionality modifier that is an alcohol containing from 3–6 hydroxyl groups; and (b) each hydroxyl group of the alcohol are reacted with from 1–12 moles of an alkylene oxide.

6. A radiation-curable formulation comprising:

(1) a multifunctional terminally-unsaturated urethane oligomer comprising the reaction product of (a) a terminally unsaturated isocyanate-containing urethane oligomer with (b) an alkoxylated polyhydric alcohol; and (2) a reactive monomer selected from the group consisting of acrylate monomers and methacrylate monomers.

* * * * *